Dec. 29, 1931.                F. C. FRANK                1,838,820
                              SHAFT SUPPORT
                          Filed March 5, 1929

INVENTOR
Frederick C. Frank
BY
M. W. McConkey
ATTORNEY

Patented Dec. 29, 1931

1,838,820

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

SHAFT SUPPORT

Application filed March 5, 1929. Serial No. 344,229.

This invention relates to supports for shafts, and is illustrated as embodied in a bracket for rotatably supporting the camshaft of an automobile or aeroplane brake. An object of the invention is to provide a light and inexpensive construction of unusual strength, by building up the support mainly of steel stampings.

Preferably there are two stampings having centrally-arranged integrally-drawn tubular portions arranged end to end, the stampings also having if desired elongated wings formed with registering openings for attaching bolts. A shaft-embracing bearing or bushing which may be of bronze, may be seated in the above-described tubular sleeves, with a shoulder seated against one stamping and with its end spun over or otherwise displaced over the other stamping, thereby securing the two stampings permanently together.

The above and other objects and features of the invention, including various novel and desirable details of construction, will be apparent from the following description of one illustrative embodiment shown in the accompanying drawings, in which.

Figure 1:
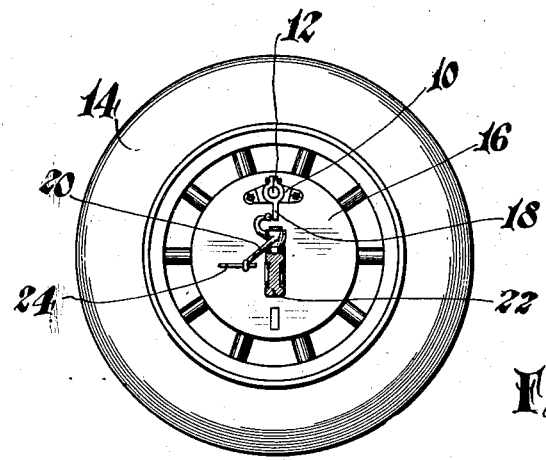
Figure 1 is a vertical section through part of an automobile chassis, looking outwardly toward the left front wheel.
Figure 2:
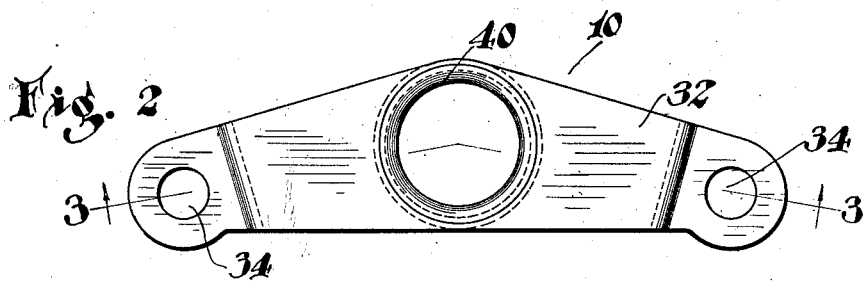
Figure 2 is an elevation of the novel shaft-supporting bracket.
Figure 3:
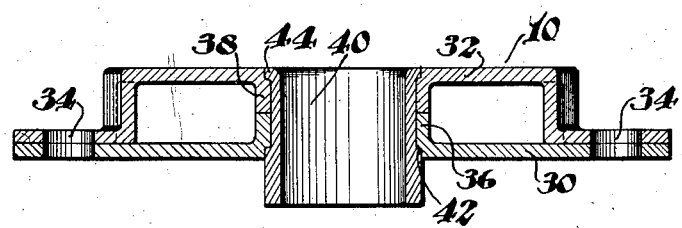
Figure 3 is a section lengthwise through the bracket on the line 3—3 of Figure 2.

In the arrangement shown, there is a novel bracket 10, embodying my invention and serving as a bearing for the camshaft 12 of a front brake on a wheel 14. The brake has a backing plate 16 to which the novel bracket is bolted or otherwise secured. The camshaft 12 has splined thereon an operating crank-arm 18 engaged by the ball-shaped end of a generally horizontal lever 20 fulcrumed on the axle 22 and operated by the usual pullrod or cable 24. The center of the ball-shaped end of lever 20 is arranged, when the brake is applied, in or immediately adjacent the swiveling axis of wheel 14.

Bracket 10 is built up of two novel steel stampings 30 and 32 having superposed end wings formed with registering openings 34 for the attaching bolts. The center of stamping 32 is bent or drawn away from the plane of its ends, so that the two stampings are spaced some distance apart at the center of the bracket. This permits forming coaxial integrally-drawn tubular portions 36 and 38, extending toward each other from the respective stampings and arranged end to end.

A shaft-receiving bearing bushing 40, of bronze or other bearing metal, is pressed into the alined tubular portions 36 and 38, and is preferably formed with a shoulder 42 seated against the stamping 30. The end of the bushing 40 may, if desired, be spun over to form a flange 44 engaging the stamping 32, thereby permanently securing the bracket assembly together.

While one illustrative embodiment has been described in detail, it is not my intention to limit the scope of the invention to that particular embodiment, or otherwise than by the terms of the appended claims.

I claim:

1. A shaft support comprising a pair of stampings having elongated wings formed with registering openings for attaching bolts and having centrally-arranged integrally-drawn coaxial tubular portions arranged end to end, in combination with a shaft-embracing bearing sleeve seated in said tubular portions and having a shoulder seated against one stamping and having its end displaced over the other stamping and thereby securing the two stampings permanently together.

2. A shaft support comprising a pair of stampings having centrally-arranged integrally-drawn coaxial tubular portions arranged end to end, in combination with a shaft-embracing bearing sleeve seated in said tubular portions and having a shoulder seated against one stamping and having its end displaced over the other stamping and thereby securing the two stampings permanently together.

3. In a brake mechanism, the combination with a backing plate of a shaft support comprising a pair of stampings having integrally co-axial tubular shouldered portions arranged end to end and providing a seat for a sleeve, the ends of the stampings superposed and apertured to provide securing means to the backing plate.

In testimony whereof, I have hereunto signed my name.

FREDERICK C. FRANK.